United States Patent

Nielsen

[15] 3,639,285
[45] Feb. 1, 1972

[54] NOVEL BLEACHING COMPOSITIONS AND USE THEREOF

[72] Inventor: Donald R. Nielsen, Corpus Christi, Tex.

[73] Assignee: PPG Industries, Inc., Pittsburgh, Pa.

[22] Filed: July 23, 1969

[21] Appl. No.: 859,521

Related U.S. Application Data

[63] Continuation of Ser. No. 584,969, Oct. 7, 1966, abandoned, Continuation-in-part of Ser. No. 308,323, Sept. 12, 1963, abandoned.

[52] U.S. Cl. .............................. 252/100, 8/111, 252/186, 260/502

[51] Int. Cl. ..................................................... C11d 7/54

[58] Field of Search .............. 252/100, 186; 8/111; 260/502

[56] References Cited

FOREIGN PATENTS OR APPLICATIONS 560,389  9/1957  Belgium ........................ 260/502 R

*Primary Examiner*—Mayer Weinblatt

[57] ABSTRACT

Stability of perphthalic acids is improved by alkali metal or alkaline earth metal salts of an acid with an ionization constant at 25° C. for the first hydrogen of at least $1 \times 10^{-3}$. The mixtures can be protectively coated with water removable coatings. Magnesium salts enhance the bleaching effect of diperisophthalic acid.

7 Claims, No Drawings

NOVEL BLEACHING COMPOSITIONS AND USE THEREOF

This application is a continuation-in-part of application Ser. No. 308,323, filed Sept. 12, 1963 now abandoned. This application is a continuation of application Ser. No. 584,969, filed Oct. 7, 1966 and now abandoned.

This invention is directed to the stabilization of perphthalic acids, such as the peracid of phthalic, terephthalic or isophthalic acids, and the halogenated (particularly the fluorinated or chlorinated) perphthalic acids, and their preparation and use as bleaching agents especially for the bleaching of textiles. These acids are capable of liberating active oxygen for bleaching and various oxidizing reactions. As a general rule, these peracids are characterized by a certain degree of instability and gradually decompose, losing their active oxygen content as they are allowed to stand. Heretofore, addition of other agents to these materials has resulted in little, if any, improvement in stability.

In accordance with this invention, it has been found that the stability of monoperphthalic acids or diperphthalic acids and mixtures thereof, particularly perisophthalic acid or the chloro derivatives thereof, can be substantially improved by incorporating therewith an amount of an alkali metal or alkaline earth metal salt of an acid having an ionization constant at 25° C. for the first hydrogen of at least $1\times10^{-3}$, preferably not less than $1\times10^{-2}$. Anhydrous alkali metal or alkaline earth metal sulfates, such as sodium sulfate or magnesium sulfate, are especially effective for this purpose. Other sulfates which can be used include potassium sulfate ($K_2SO_4$), ammonium sulfate, lithium sulfate, and like sulfates of alkali metals. Bisulfates also may be used. Thus, sodium bisulfate or potassium bisulfate or like alkali metal bisulfate stabilize perphthalic acids although not as sodium sulfate or like neutral sulfates.

Various other salts of acids having the dissociation constants specified above with alkaline earth metals and alkali metals (ammonium salts being included within the term "alkali metal salts" and magnesium within the term "alkaline earth metals") such as sodium nitrate, magnesium nitrate, calcium nitrate and like nitrates, as well as the corresponding pyrophosphates or polyphosphates, may be used. Advantageously, the stabilizing salts should possess substantial water solubility, e.g., above 5 to 10 grams per liter. However, less soluble salts, such as calcium sulfate or calcium or magnesium phosphates, may be used where solution of the salt is not important. Furthermore, these agents should be inert to peracids. Alkaline materials often are undesirable and impart instability. Consequently, the mixture of salt and perphthalic acid should advantageously have a pH not above 8, and preferably on the acid side, i.e., approximately the natural pH of the peracid.

The amount of stabilizing salt used normally is large, particularly when water soluble salts are used. As a general rule, amounts at least equal to one-half part by weight of alkali metal or alkaline earth metal salt per part by weight of the peracid are found satisfactory, and amounts in the range of one to 10 parts of stabilizing salt per part of the peracid are found useful. Even larger amounts of such salt may be used, the major limit being simply that the peracid should not be so diluted as to effectively lose the value of its active oxygen content.

As a general rule, it is undesirable to incorporate other organic materials which can contaminate the product or promote instability of the perphthalic acid. Of course, other inert materials can be added. However, the incorporation of synthetic organic detergents, such as alkyl sulfates and sulfonates and the like, may be found to be disadvantageous to the stability of the ultimate product.

This difficulty may be avoided, however, by either coating or encapsulating the mixture of perphthalic acid and sodium sulfate or the detergent with a suitable inert protective coating, such as paraffin wax, polyvinyl alcohol or the solid polymeric glycols or the like, which are water soluble or water dispersible, in order to segregate the detergent, alkaline agent or like material from the perphthalic-stabilizing salt mixture. The mixture thus protected may be mixed with dry detergents or other materials, whether or not they attack unprotected perphthalic acid.

In typical examples, dry perisophthalic acid was produced according to the method described in the article in Journal of Organic Chemistry, Volume 27, page 1,336 (1962) by Silbert, Siegel and Swern. The products obtained were finely divided solids which had active oxygen contents stoichiometrically equivalent to the theoretical active oxygen content of 85 to 90 percent diperisophthalic acid.

EXAMPLE I

Samples of diperisophthalic acid of approximately 85-percent assay were intimately mixed with equal weights of finely powdered sodium sulfate (technical grade), potassium sulfate and a 3:1 by weight mixture of sodium carbonate and sodium sulfate. These samples and a portion of the undiluted peracid were allowed to stand at 60° C. under an air atmosphere of 52-percent relative humidity for 45 days. Each sample was analyzed for active oxygen by dissolving in dilute sulfuric acid solution containing potassium iodide and titrating the liberated iodine with thiosulfate. The results are shown in the following table:

| Additive | Average percent Decomposition/day* | Percent improvement in stability |
|---|---|---|
| None | 8.6 | — |
| $Na_2SO_4$ | 0.2 | 4,300 |
| $K_2SO_4$ | 0.7 | 1,130 |
| $Na_2CO_3$, $Na_2SO_4$ | 0.8 | 980 |

*Calculated as percent of the total active oxygen lost per day.

EXAMPLE II

Another sample of diperisophthalic acid was divided into four beakers. The peracid samples in three of the beakers were mixed with equal weights of solid, pulverulent sodium nitrate, ammonium sulfate and magnesium sulfate under the conditions specified in example I, and allowed to stand. Analysis after 45 days gave the following results:

| Additive | Average percent Decompositon/day* | Percent Improvement in stability |
|---|---|---|
| None | 7.9 | — |
| $NaNO_3$ | 0.9 | 780 |
| $(NH_4)_2SO_4$ | 0.6 | 1,220 |
| $MgSO_4$ | 0.5 | 1,480 |

*Calculated as percent of total active oxygen lost per day.

EXAMPLE III

A third sample of diperisophthalic acid was divided into two portions, and one portion was mixed with an equal weight of finely powdered sodium sulfate. Both the diluted and undiluted peracids were allowed to stand under an air atmosphere of less than 5 percent relative humidity at 60° C. for 35 days. Analysis at the end of this time indicated that the undiluted peracid decomposed at an average rate of 1.6 percent per day, and the sample of peracid which was diluted with sodium sulfate decomposed at an average rate of 0.1 percent per day.

EXAMPLE IV

Attempts to stabilize other peracids, both aromatic and aliphatic, with this method have met with, at best, only a slight improvement in stability. Diperazelaic acid was mixed with three times its weight of sodium sulfate and allowed to stand at less than 5-percent relative humidity and 40° C. for 70 days. A portion of the undiluted peracid was treated identically. p-Nitroperbenzoic acid was also mixed with three times its weight of sodium sulfate, and p-chloroperbenzoic acid and m-chloroperbenzoic acid were both mixed with an equal weight of sodium sulfate. Each sample was allowed to stand along with an undiluted sample of the same peracid at 60° C. under a relative humidity of less than 5 percent in the first two cases and 52 percent in the latter case. Analysis after 13–40 days indicated that the additive in some cases actually accelerated the decomposition rate of the peracid as shown in the following table:

| Peracid | Percent Decomposition per day By itself | Percent Decomposition per day in the Pressure of $Na_2SO_4$ |
| --- | --- | --- |
| Diperazelaic | 0.7 | 0.4 |
| p-nitroperbenzoic | 0.4 | 0.3 |
| p-chloroperbenzoic | 2.0 | 2.8 |
| m-chloroperbenzoic | 1.2 | 6.1 |

EXAMPLE V

Samples of diperisophthalic acid were mixed with potassium bisulfate, sodium dihydrogen phosphate and sodium tripolyphosphate and allowed to stand at 60° C. under an atmosphere of less than 5-percent relative humidity for 45 days along with a sample of the undiluted peracid. The results are summarized in the following table:

| Additive | Average percent Decomposition/day | Percent improvement in stability |
| --- | --- | --- |
| None | 7.8 | — |
| $KHSO_4$ | 2.0 | 290 |
| Sodium dibasic-phosphate | 0.9 | 990 |
| Sodium tripoly-phosphate | 0.9 | 990 |

The resulting composition is useful as a bleaching agent for the bleaching of textiles. For example, it can be used effectively in domestic washing machines as a bleaching agent which is used in conjunction with the usual detergents. It is readily soluble (particularly when water-soluble salts are used as stabilizers) and when added to the laundry solution, liberates its oxygen in a form which effectively promotes bleaching. The material can be used in conjunction with the various conventional detergents, including alkali metal silicates, synthetic organic detergents, such as sodium dodecyl sulfate or like alkali metal, alkyl or aralkyl sulfates or sulfonates, and the like.

Especially effective bleaching of textiles may be accomplished, for example, in domestic washing machines, by the use of compositions herein described as illustrated by the following:

EXAMPLE VI

The efficiency of the bleaching agent was evaluated by a procedure in which 4-inch square white cotton percale swatches (four each) stained with tea, coffee, grape juice, wine and EMPA (an easily bleached sulfur dye bought from Test Fabrics, Inc.) were measured before and after washing using the blue, amber and green filters of a Hunter Reflectometer. The average of the increases measured with all three filters on all four of the swatches were used in calculating the percent stain removal by the formula:

$$\% \text{ stain removal} = \frac{\text{(final reflectance-initial reflectance)}}{\text{(reflectance of unstained cloth-initial reflectance)}} \times 100$$

Washing was performed in a top loading home laundry machine (General Electric) using Corpus Christi city water, using washer settings of a hot wash (49°–51° C.), warm rinse, normal speed, 1 to 6 pound loading (16 gallons of water) and a 12-minute wash cycle. After filling the washer with water, 86.4 grams (one cup) of a commercial detergent (Tide) was added and the solution agitated for 15 seconds. Then the bleaching agent in an amount sufficient to give the active oxygen content specified in the ensuing table was added. Following a further 15 second agitation period, half of a 4.5-pound load of soiled clothing, the stained swatches (20 in all) and the balance of the soiled clothing were sequentially added. The 12-minute wash cycle was started and the machine then operated through its normal spin and rinse cycles.

The pH of the various wash solutions in the various tests was measured and varied from about 8.6 to 9.4.

Using the above materials, conditions and equipment, tests were performed using as bleaching agent (1) diperisophthalic acid and (2) a mixture of one part of diperisophthalic acid and about 3.8 parts by weight magnesium sulfate with these results:

| | Percent stain removal Active oxygen (parts per million) | | |
| --- | --- | --- | --- |
| Tea stain | 25 | 35 | 50 |
| Peracid alone | 40 | 35 | 45 |
| Peracid-$MgSO_4$ mixture | 70 | 65 | 65 |
| Tide alone | 19 | 19 | 19 |
| Coffee Stain | | 35 | 50 |
| Peracid alone | | 80 | 80 |
| Peracid-$MgSO_4$ mixture | | 95 | 105 |
| Tide alone | | 55 | 55 |
| Wine Stain | | 35 | 50 |
| Peracid alone | | 90 | 90 |
| Peracid-$MgSO_4$ mixture | | 100 | 110 |
| Tide along | | 65 | 65 |
| Grape Stain | | 35 | 50 |
| Peracid alone | | 90 | 90 |
| Peracid-$MgSO_4$ mixture | | 100 | 107 |
| Tide alone | | 73 | 73 |

| | Increase in Reflectance (Averaging the blue, green, and amber filters) | |
| --- | --- | --- |
| EMPA stain | 35 | 50 |
| Peracid alone | 3 | 5 |
| Peracid-$MgSO_4$ mixture | 13 | 12 |
| Tide alone | about 2 | about 2 |

As the foregoing demonstrates, bleaching of textiles in aqueous media to which perphthalic acid and a magnesium salt such as magnesium sulfate have been added provides a high degree of stain removal, a level of removal which is markedly higher than when the magnesium salt is not added. Other of the hereinbefore described magnesium salts, notably the water soluble magnesium salts also provide bleaching compositions of corresponding usefulness. Besides the particular textile, percale cotton goods employed in the bleaching of example VI, other textiles (dyed and undyed) may be bleached effectively by such procedure with such compositions including other celluloses, synthetic (rayons) or natural, as well as textiles containing nylon, synthetic fiber-forming polymers including polyester types such as fortrel, Kodel and Dacron, polyacrylonitrile types such as Acrylon and Lycra;

proteinaceous materials, especially woolens and various combinations thereof.

Considerable latitude in the amount of the perphthalic acid bleaching agent and magnesium salt added to the aqueous media to form useful bleaching baths and achieve bleaching is permissible, note the benefits reaped at the varying active oxygen levels in example VI. Also bleaching is effected in an aqueous medium at all normal temperatures, usually from tap water temperatures (about 20° or 25° C.) up to about boiling, 100° C., with a range of 40° to 70° C. being recommended.

Mostly, the aqueous medium in which bleaching (including stain removal) is effected is at a slightly alkaline pH, i.e., above pH 7, typically between pH 8 and 10.

Moreover, this bleaching can and often is accomplished in aqueous medium which also includes conventional detergents.

Although the present invention has been described with reference to the specific details of certain embodiments, it is not intended that such details shall be regarded as limitations upon the scope of the invention herein described except insofar as much limitations are included in the accompanying claims.

I claim:

1. A method of bleaching which comprises forming an aqueous bleaching bath by adding both diperisophthalic acid and water-soluble magnesium salt to an aqueous medium and contacting material to be bleached with the bath.

2. The method of claim 1 wherein the salt is magnesium sulfate.

3. In the method of washing textiles in aqueous media with detergents, the improvement which comprises adding both diperisophthalic acid and water soluble magnesium salt to the aqueous media whereby to bleach the textile during the washing.

4. The method of claim 3 wherein the magnesium salt is magnesium sulfate.

5. A method of employing diperisophthalic acid to remove stain from textiles which comprises enhancing the stain-removing effectiveness of diperisophthalic acid by contacting stained textile with an aqueous medium containing added water-soluble magnesium salt in addition to added diperisophthalic acid whereby to attain a level of stain removal higher than when magnesium salt is not added.

6. The method of claim 5 wherein the stained textile contacted with said aqueous medium is stained cotton textile.

7. The method of claim 5 wherein the magnesium salt is magnesium sulfate.

* * * * *